United States Patent
Lahr et al.

(10) Patent No.: US 8,788,125 B1
(45) Date of Patent: Jul. 22, 2014

(54) OBJECT SYMBOLOGY GENERATING SYSTEM, DEVICE, AND METHOD

(71) Applicants: Weston J. Lahr, Sherwood, OR (US); Carlo L. Tiana, Portland, OR (US); Ian J. Bull, Portland, OR (US)

(72) Inventors: Weston J. Lahr, Sherwood, OR (US); Carlo L. Tiana, Portland, OR (US); Ian J. Bull, Portland, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 13/954,438

(22) Filed: Jul. 30, 2013

(51) Int. Cl.
*G06F 7/70* (2006.01)

(52) U.S. Cl.
USPC .......................................................... 701/14

(58) Field of Classification Search
None
See application file for complete search history.

(56) References Cited

U.S. PATENT DOCUMENTS

| | | | | |
|---|---|---|---|---|
| 4,247,843 A * | 1/1981 | Miller et al. | ................... | 340/973 |
| 7,417,641 B1 * | 8/2008 | Barber et al. | ................. | 345/589 |
| 7,675,461 B1 * | 3/2010 | McCusker et al. | ............ | 342/179 |
| 7,787,999 B1 * | 8/2010 | Barber | ............................ | 701/14 |
| 8,094,188 B1 * | 1/2012 | Yum et al. | ....................... | 348/113 |
| 8,188,972 B1 * | 5/2012 | Krenz et al. | .................... | 345/157 |
| 8,344,911 B1 * | 1/2013 | Wenger et al. | ................. | 340/973 |
| 8,462,018 B1 * | 6/2013 | Shepherd et al. | ............. | 340/945 |
| 8,633,913 B1 * | 1/2014 | Raghu et al. | ................... | 345/173 |
| 2005/0035898 A1 * | 2/2005 | Shiomi et al. | .................... | 342/36 |
| 2005/0156777 A1 * | 7/2005 | King et al. | ........................ | 342/29 |
| 2008/0195966 A1 * | 8/2008 | Jean et al. | ....................... | 715/781 |
| 2009/0319103 A1 * | 12/2009 | Dwyer et al. | .................... | 701/14 |
| 2010/0094487 A1 * | 4/2010 | Brinkman | ........................ | 701/14 |
| 2010/0106346 A1 * | 4/2010 | Badli et al. | .......................... | 701/3 |
| 2010/0250030 A1 * | 9/2010 | Nichols et al. | ..................... | 701/7 |
| 2012/0209468 A1 * | 8/2012 | Thomas | ........................ | 701/29.1 |
| 2013/0179842 A1 * | 7/2013 | Deleris et al. | ................. | 715/853 |

OTHER PUBLICATIONS

"Cockpit Display System Interfaces to User Systems", May 10, 2010, ARINC Specification 661-4, Aeronautical Radio, Inc., Annapolis, Maryland.

* cited by examiner

*Primary Examiner* — John R Olszewski
*Assistant Examiner* — Navid Ziaeianmehdizadeh
(74) *Attorney, Agent, or Firm* — Donna P. Suchy; Daniel M. Barbieri

(57) ABSTRACT

A present novel and non-trivial system, device, and method for generating object symbology are disclosed. A system may be comprised one or more aircraft systems and a cockpit display system comprised of a system configuration file, a plurality of definition files, and a windows generator ("WG"). The WG may be configured to perform initialization and run-time operations. The initialization operation may be comprised of retrieving a system configuration file; retrieving a first definition file comprised of a first layer; and retrieving one or more second definition files comprised of one or more second layers. The run-time operation may be comprised of receiving a first-layer widget data set; receiving one or more second-layer widget data sets; determining each screen array cell; and generating a pixel data set in response to the determination.

21 Claims, 10 Drawing Sheets

| MapHorz Parameters (Partial) |
|---|
| PosX |
| PosY |
| SizeX |
| SizeY |
| Projection Reference Point Latitude |
| Projection Reference Point Longitude |
| ScreenReferencePointX |
| ScreenReferencePointY |
| Range |
| ScreenRange |
| Orientation |
| AircraftOrientation |
| AircraftLatitude |
| AircraftLongitude |

FIG. 2

| ViewPort Parameters (Partial) |
|---|
| PosX |
| PosY |
| SizeX |
| SizeY |
| ScreenReferencePointX |
| ScreenReferencePointY |
| FOV(h) and FOV(v) |
| PitchAttitude |
| RollAttitude |
| YawAttitude |
| AircraftLatitude |
| AircraftLongitude |
| AircraftAltitude |
| AircraftHeading |

FIG. 3A

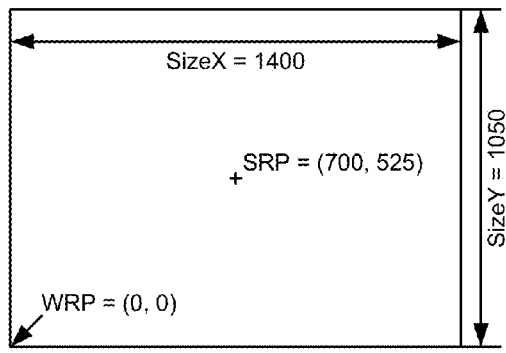

FIG. 3B

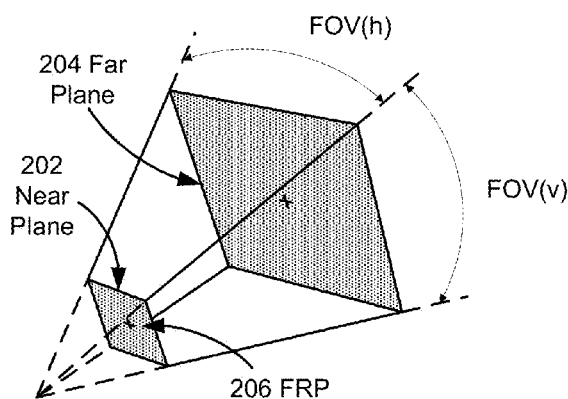

FIG. 3C

Formula 5-3: $X(3) = SRP(X) * \tan(B) / \tan(0.5 * FOV(h))$
Formula 5-4: $Y(3) = SRP(Y) * \tan(\arcsin(H / R)) / \tan(0.5 * FOV(v))$
Formula 5-5: $X(P) = SRP(X) + X(3)$
Formula 5-6: $Y(P) = SRP(Y) + Y(3)$ SP = arctan(Y(3) / X(3))
X(5) = SQRT(X(3)^2 + Y(3)^2) * cos(SP + Ro)
Y(5) = SQRT(X(3)^2 + Y(3)^2) * sin(SP + Ro)

Formula 6-3: X(5) = SQRT(X(3)^2 + Y(3)^2) * cos(arctan(Y(3) / X(3)) + Ro)
Formula 6-4: Y(5) = SQRT(X(3)^2 + Y(3)^2) * sin(arctan(Y(3) / X(3)) + Ro)
Formula 6-5: X(P2) = SRP(X) + X(5)
Formula 6-6: Y(P2) = SRP(Y) + Y(5)

MapGird Parameters (Partial)
CountX
CountY
OffsetX
OffsetY
IncrementX
IncrementY
StartIndexX
StartIndexY
NumberColumns
NumberRows
StepX
StepY
ParameterValue

FIG. 6A

ViewPortGrid Parameters (Partial)
CountX
CountY
OffsetX
OffsetY
IncrementX
IncrementY
StartIndexX
StartIndexY
StartIndexZ
NumberColumns
NumberRows
NumberCellLayers
StepX
StepY
StepZ
ParameterValue

FIG. 6B

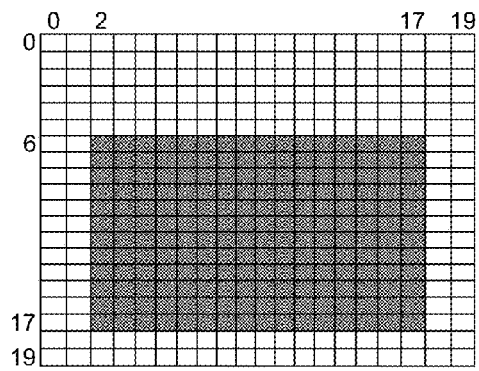

FIG. 6C

OBJECT SYMBOLOGY GENERATING SYSTEM, DEVICE, AND METHOD

BACKGROUND OF THE INVENTION

1. Field of the Invention

This invention pertains generally to the field of aircraft display units that provide information to the pilot or flight crew of an aircraft.

2. Description of the Related Art

Aeronautical Radio, Incorporated ("ARINC") has published ARINC Specification 661 entitled "Cockpit Display System Interfaces to User Systems" ("ARINC 661"), an industry standard which defines an architecture to facilitate a creation of interactive displays. ARINC 661 standardizes the fundamental building blocks of cockpit avionics displays by providing specification that separates graphics from logic, defines a runtime architecture, and defines a communication protocol. The contents of ARINC 661 are known to those skilled in the art.

The Cockpit Display System ("CDS") may display widgets to the end user, where ARINC 661 specifies a standard set of widgets to develop a cockpit display; a widget may be considered as a displayable entity that is either interactive or non-interactive. At startup, the CDS loads and displays widgets listed in Definition Files ("DFs" or singularly, "DF"). Each DF is comprised of one or more layers, which are hierarchical listings of widgets that are loaded along with their initial properties such as, but not limited to, visibility and enablement. A DF may be associated with a User Application ("UA").

ARINC 661 architecture separates graphics from logic. A UA may be connected to one or more layers and owned by an aircraft system and programmed with the logic for providing updated data via widget parameters to the CDS and reacting to user interactions with a display unit. Examples of aircraft systems that could own one or more UAs include, but are not limited to, air conditioning, auto flight, communications, electrical power, equipment and furnishings, fire protection, flight controls, fuel, hydraulic power, ice and rain protection, instruments, landing gear, lights, navigation, oxygen, pneumatic, vacuum, waste/water, central maintenance system, auxiliary power unit, propellers, main rotor, main rotor drive, tail rotor, tail rotor drive, rotors flight control, propeller/rotor systems, and powerplant systems.

In addition, ARINC 661 recommends a bi-directional runtime communication protocol for the exchange of data and events. In addition, ARINC 661 specifies how each widget interacts with end-users, the CDS, and the UAs.

Although ARINC 661 provides a standard for cockpit avionics displays, ARINC 661 does not provide for the presentation of objects in an image presenting an egocentric or exocentric view.

BRIEF SUMMARY OF THE INVENTION

The embodiments disclosed herein present at least one novel and non-trivial system, device, and method for generating object symbology that is presented on an aircraft display unit configured to display an image presenting an egocentric or exocentric view.

In one embodiment, a system for generating object symbology is disclosed. The system may be comprised of one or more aircraft systems and a cockpit display system comprised of a system configuration file, a plurality of definition files, and a windows generator ("WG"). In an additional embodiment, the system could also be comprised of one or more display units.

In another embodiment, a device for generating object symbology is disclosed. The device may be comprised of the WG configured to perform the method disclosed in the following paragraph.

In another embodiment, a method for generating object symbology is disclosed. The method may be comprised of performing a first operation and a second operation, where the first operation may be performed during an initialization phase, and the second operation may be performed during a run-time phase. The first operation may be comprised of retrieving the system configuration file; retrieving a first definition file comprised of a first layer; and retrieving one or more second definition files comprised of one or more second layers. The second operation may be comprised of receiving a first-layer widget data set; receiving one or more second-layer widget data sets; determining the fill style of each screen array cell; and generating a pixel data set in response to the determination. Additionally, the method may be further comprised of providing the pixel data set to one or more display units.

BRIEF DESCRIPTION OF THE DRAWINGS

FIG. 2 depicts table containing a partial list of widget parameters of a MapHorz widget.

FIG. 3A depicts a table listing a partial list of ViewPort widget parameters.

FIG. 3B illustrates a ViewPort widget.

FIG. 3C illustrates an exemplary depiction of a view frustum.

FIG. 6A depicts a table listing a partial list of MapGrid widget parameters.

FIG. 6B depicts a table listing a partial list of ViewPortGrid widget parameters.

FIG. 6C illustrates an exemplary depiction of a ViewPortGrid widget.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1A:
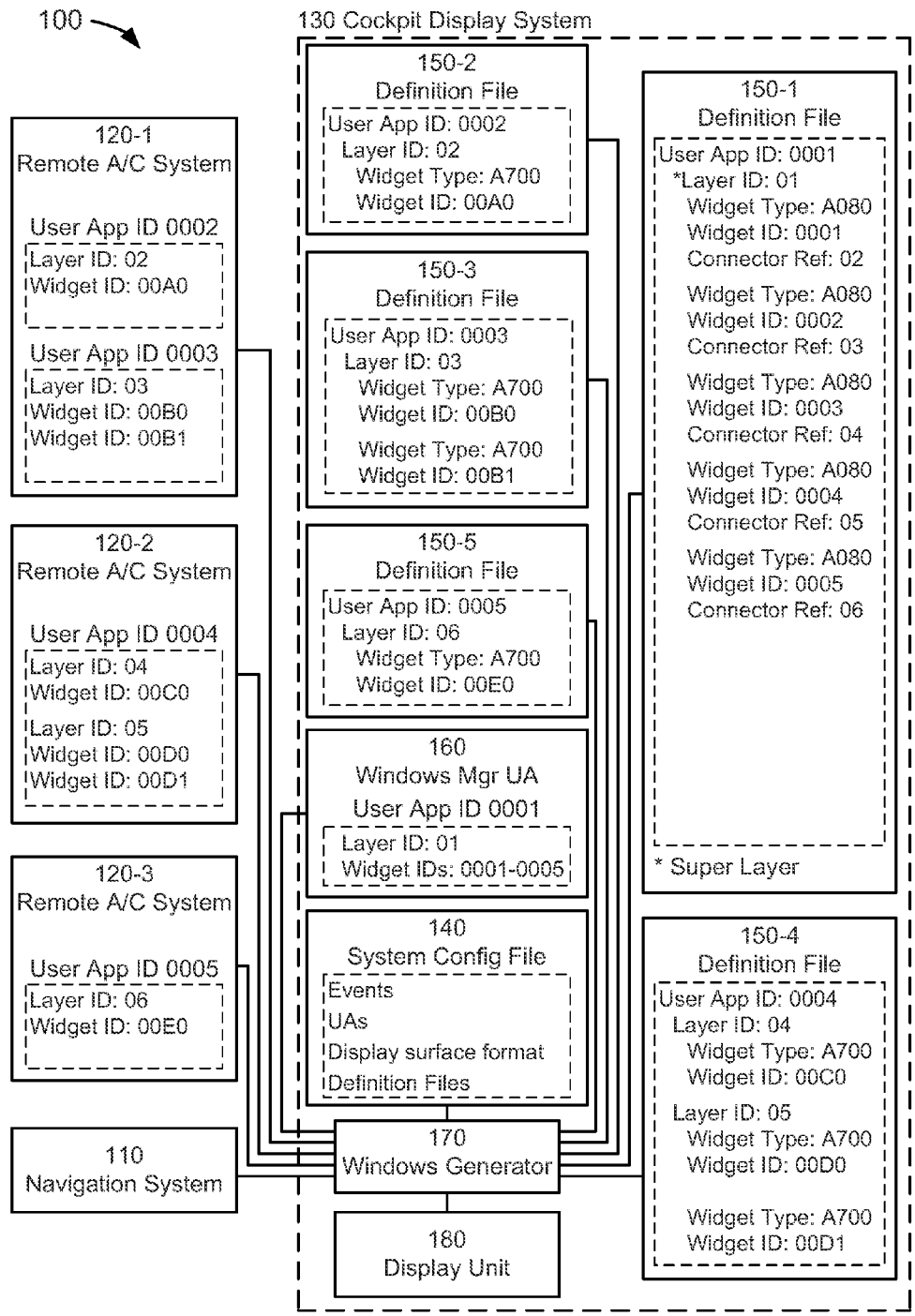
FIG. 1A depicts a block diagram of a windows management and presentation system for generating object symbology for an aircraft display unit.

FIG. 1A depicts a block diagram of an object symbology generating system 100 suitable for implementation of the techniques described herein, wherein object information acquired by a variety of disparate aircraft systems employing different coordinates systems may be sent via one uniform data transmission protocol and used to generate image data representative of objects that is presented on an aircraft display unit(s). The presentation system 100 of an embodiment of FIG. 1A includes a pilot input device 110, at least one remote aircraft system 120, and a cockpit display system ("CDS") 130.

In an embodiment of FIG. 1A, the pilot input device 110 may be comprised of any source for facilitating a pilot's interaction with an egocentric and/or exocentric view system, a view system known to those skilled in the art. For example, the pilot input device 110 may be used by the pilot to manipulate the rho, theta, and/or phi measurements of a rho/theta/phi coordinate system, a coordinate system commonly applied in the generation of the exocentric view. As embodied herein, the pilot input device 110 may provide input representative of a pilot's selection to a windows generator ("WG") 170. It should be noted that, although the discussion herein is drawn to the term "pilot," the definition of such term should not be limited to flight personnel but should include ground personnel and/or any viewer of the display unit 180.

In an embodiment of FIG. 1A, remote aircraft systems 120 may be comprised of any system installed in an aircraft in which a user application ("UA") has been installed. Types of remote aircraft systems include, but are not limited to, air conditioning, auto flight, communications, electrical power, equipment and furnishings, fire protection, flight controls, fuel, hydraulic power, ice and rain protection, instruments, landing gear, lights, navigation (including a flight management system ("FMS"), traffic collision and avoidance system ("TCAS"), automatic dependent surveillance-broadcast system ("ADS-B"), a forward-looking radar system, and terrain awareness and warning system ("TAWS")), oxygen, pneumatic, vacuum, waste/water, central maintenance system, auxiliary power unit, propellers, main rotor, main rotor drive, tail rotor, tail rotor drive, rotors flight control, propeller/rotor systems, and powerplant systems.

As introduced in the preceding paragraph, the navigation system may be comprised of, but is not limited to, an air/data system, an attitude heading reference system, an inertial guidance system (or inertial reference system), a global navigation satellite system (or satellite navigation system), and the FMS which includes a navigation database configured to store waypoints, all of which are known to those skilled in the art. The navigation system could provide navigation data including, but not limited to, latitude, longitude, altitude, heading, pitch attitude, roll attitude, and yaw attitude; the navigation data could also include flight plan information which identifies or states invisible objects such as waypoints and visible objects such as airports as discussed below. As embodied herein, a navigation system could provide navigation data to the WG 170 for subsequent processing as discussed herein.

As embodied herein, the UA of the remote systems 120, a system configuration file ("CF") 140, a plurality of definition files (DFs, or singularly "DF") 150, a windows manager UA ("WMUA") 160, and the WG 170 may be comprised of software components stored in a digital memory storage device or generator-readable media (i.e., media readable by the WG 170) including, but not limited to, a plurality of types of RAMs, a plurality of types of ROM, CD, DVD, hard disk drive, diskette, solid-state memory, PCMCIA or PC Card, secure digital cards, compact flash cards, and/or memory currently in development that is suitable for performing the embodiments disclosed herein. Although the CF 140, the DFs 150, and the WMUA 160 are illustrated as being internal to the CDS 130, the storage devices storing any one of these may be external to the CDS 130 and used as an internal component of any other system of the aircraft.

Each remote aircraft system 120 could own one or more UAs and the layers included therein, where the layer may be considered as the highest level entity known by each UA. Referring to FIG. 1, remote aircraft system 120-1 owns UAs 0002 and 0003 and layers 02 and 03, remote aircraft system 120-2 owns UA 0004 and layers 04 and 05, and remote aircraft system 120-3 owns UA 0005 and layer 06. In addition to each remote aircraft system 120, the CDS 130 owns WMUA 160 and layer 01.

The UAs of each remote aircraft system 120 may facilitate the dynamic exchange of blocks of data between the CDS 130 and the remote aircraft systems 120, where exchange protocols have been published by Aeronautical Radio, Incorporated ("ARINC") in ARINC Specification 661 entitled "Cockpit Display System Interfaces to User Systems" ("ARINC 661"), an aviation industry standard which is hereby and herein incorporated by reference in its entirety. On the one hand, the UAs of the remote aircraft systems 120 may send real-time parameters measured and/or calculated by the remote aircraft systems 120 to the CDS 130 as updated runtime parameters of one or more widgets; also, UAs may request changes to one or more layer properties such as, but not limited to, layer visibility. Referring to FIG. 1, real-time parameters of remote aircraft systems 120-1 through 120-3 may be sent as runtime parameters of their respective widgets; additionally, requests for runtime changes affecting properties of layers 02 through 06 may be sent.

On the other hand, the CDS 130 may send notices of real-time event occurrences (e.g., events initiated by interactions between a pilot and interactive widgets) to the UAs of the remote aircraft systems 120 as well as send notices of layer property changes such as, but not limited to, changes to layer activation. Referring to FIG. 1, a notice of real-time event occurrence may be sent to UAs 0002 through 0005 for interactions with their respective interactive widgets; additionally, notices of runtime changes affecting the properties of layers 02 through 06 may be sent. As embodied herein, the remote aircraft systems 120 may provide input to the WG 170 representative of widget parameters and layer properties; also, the remote aircraft systems 120 may receive output of the WG 170 representative of widget events and layer properties.

In an embodiment of FIG. 1A, the CDS 130 may be comprised of many components including the system CF 140, the plurality of DFs 150, the WMUA 160, the WG 170, and/or the display unit 180. The system CF 140 may configure the initial settings for the CDS 130. The system CF 140 may be comprised of instructions for establishing a communication link(s) with one or more pilot input devices 110 for the subsequent receiving of input from a pilot's selection(s) through his or her interaction with widget(s), where such input may trigger the WG 170 to recognize event(s) associated with the pilot's selection(s). Also, the system CF 140 may include instructions or information related to the UAs and the layers owned by both the remote aircraft systems 120 and the WMUA 160, the configuration of a display surface format associated with the location of window(s) and the assignment of layer(s) to each window, and the loading and interpreting of the plurality of DFs 150. As embodied herein, the contents of the system CF 140 may be loaded and interpreted by the WG 170.

In an embodiment of FIG. 1A, DFs 150 could describe a hierarchical structure of widgets assigned to layers, where the widget could be considered as a building block. Each widget could be defined by a set of parameters that control the graphical and/or interactive characteristics of that widget, where each parameter could be fixed or modified during runtime, i.e., a runtime parameter. Examples of widget parameters include, but are not limited to, visibility and enablement Also, each widget could have a graphical look that represents how the object will appear when it is drawn on the display surface of the display unit 180. As stated above, an interactive widget could be a GUI which provides a means for the pilot to interact with the CDS 130.

A widget could be grouped into one or more categories such as, but not limited to, the following: a container or logical widget (e.g., basic container, mutually exclusive container, radio box, etc. . . . ), a graphical representation widget (e.g., edit box text, graphical primitive ("GP") line, GP rectangle, label, push button, toggle button, etc. . . . ), a text string widget (edit box text, label, push button, toggle button, etc. . . . ), an interactive widget (e.g., edit box text, push button, toggle button, etc. . . . ), a map management widget (e.g., map grid, horizontal map, horizontal map source, horizontal map item list, etc. . . . ), a dynamic motion widget (e.g., GP line, GP rectangle, label, etc. . . . ), a utility widget (e.g., connector, cursor reference, etc. . . . ), and a UA validation widget (e.g., basic container, edit box text, horizontal map, horizontal map source, mutually exclusive container, push button, radio box, toggle button, etc. . . . ). A layer could be comprised of a single widget or a grouping of widgets (or a list of widgets). Referring to FIG. 1, layer 01 of DF 150-1 is comprised of a grouping of widgets identified as 0001 through 0005; this layer has been designated as a super layer. Layer 02 of DF 150-2, layer 04 of DF 150-4, and layer 06 of DF 150-5 are comprised of single widgets 00A0, 00C0, and 00E0, respectively. Layer 03 of DF 150-3 is comprised of a grouping of widgets identified as 00B0 and 00B1, and layer 05 of DF 160-4 is comprised of a grouping of widgets identified as 00D0 and 00D1.

A grouping or list of widgets could be drawn in an area of a window defined by a display surface format, where such format may be used for depicting images known to those skilled in the art. Display surface formats could be created from a single layer, and other display surface formats could be created from a plurality of different layers occupying the same area of a window, where each layer could be associated with, but not limited to, one or more of the following systems: an FMS, a TCAS, an ADS-B, a forward-looking radar system, a TAWS, a weather awareness and warning system, and an airspace awareness and warning system.

Each DF 150 could be comprised of a single layer or a grouping of layers. Each DF 150 may specify the definition of widget hierarchical structures and creation of widgets that describe UA interface pages. Referring to FIG. 1, DFs 150-1, 130-2, 130-3, and 130-5 are comprised of single layers 01, 02, 03, and 06, respectively. DF 150-4 is comprised of a grouping of layers 04 and 05. As discussed above, each DF 150 and each layer included therein could be owned by one UA. Referring to FIG. 1, DF 150-1 is owned by WMUA 160, and DFs 150-2 through 130-5 are owned by UAs 0002 through 0005, respectively.

In an embodiment of FIG. 1A, the WMUA 160 is representative of one or more UAs that could be owned by the CDS 130. Similar to the UAs of each remote aircraft system 120, the WG 170 may send notices of real-time event occurrences to the WMUA 160 and layer property changes such as changes to layer activation of layer 01. Responding to such notices, the WMUA 160 may update the runtime parameters of one or more widgets and send to the WG 170 requests for changes to one or more layer properties such as the layer visibility and activity of layer 01. As embodied herein, the contents of the DFs 150 may be read by the WG 170.

It should be noted that, although the discussion has been drawn towards the employment of the WMUA 160, the embodiments disclosed herein include a generating system 100 in which the WMUA 160 is not employed. Instead, the master application (or master UA) as discussed in ARINC 661 owning a ViewPort widget (as disclosed below) may be owned by an aircraft remote system 120.

In an embodiment of FIG. 1A, the WG 170 may be comprised of any electronic data processing unit which executes software or source code stored, permanently or temporarily, in a digital memory storage device as discussed above. The WG 170 may be driven by the execution of software or source code containing algorithms developed for the specific functions embodied herein. Common examples of electronic data processing units are microprocessors, Digital Signal Processors, Programmable Logic Devices, Programmable Gate Arrays, and signal generators; however, for the embodiments herein, the term generator is not limited to such processing units and its meaning is not intended to be construed narrowly. For instance, a processor could also consist of more than one electronic data processing units. As embodied herein, the WG 170 could be a processor(s) used by or in conjunction with any other system of the aircraft.

The WG 170 may be programmed or configured to receive as input data representative of information obtained from the pilot input device 110, the remote aircraft systems 120, and the components of the CDS 130. As embodied herein, the terms "programmed" and "configured" are synonymous with respect to the execution of software or source code developed for the specific functions and methods embodied herein. The WG 170 may be electronically coupled to systems and/or sources to facilitate the receipt of input data; as embodied herein, operatively coupled may be considered as interchangeable with electronically coupled. The WG 170 may be programmed to execute the methods embodied herein and discussed in detail below. The WG 170 may be programmed to provide output data to the remote aircraft systems 120, the components of the CDS 130, and the display unit 180. The WG 170 may be electronically coupled to systems and/or units to facilitate the providing of output data representative of a procedure. It is not necessary that a direct connection be made; instead, such receipt of input data and the providing of output data could be provided through a data bus or through a wireless network.

In an embodiment of FIG. 1A, the display unit 180 may be comprised of any unit having a display surface on which widgets may be presented to the pilot on a display surface of the display unit 180. The display unit 180 could be, but is not limited to, a Primary Flight Director ("PFD"), Navigation Display ("ND"), Head-Down Display ("HDD") Unit, Head-Up Display ("HUD") Unit, Multi-Purpose Control Display Unit, EICAS, Electronic Centralized Aircraft Monitor, Multi-Function Display, Side Displays, and Data Link Control Display Unit.

The HDD unit may present flight information to the pilot or flight crew-information relevant to the instant or immediate control of the aircraft, whether the aircraft is in flight or on the ground. The HDD unit is typically a unit mounted to an aircraft's flight instrument panel located in front of a pilot and below the windshield and the pilot's field of vision. The HDD unit displays the same information found on a PFD, such as "basic T" information (i.e., airspeed, attitude, altitude, and heading). Although it provides the same information as that of a PFD, the HDD unit may also display a plurality of indications or information including, but not limited to, selected magnetic heading, actual magnetic track, selected airspeeds, selected altitudes, altitude barometric correction setting, vertical speed displays, flight path angle and drift angles, flight director commands, limiting and operational speeds, mach number, radio altitude and decision height, final approach trajectory deviations, and marker indications. The HDD unit is designed to provide flexible configurations which may be tailored to the desired configuration specified by a buyer or user of the aircraft.

The HUD unit provides flight information to the pilot or flight crew in the pilot's forward field of view through the windshield, eliminating transitions between head-down to head-up flying. Similar to the HDD unit, the HUD unit may be tailored to the desired configuration specified by a buyer or user of the aircraft. As embodied herein, the display unit 180 may receive image data provided by the WG 170.

The WG 170 may be programmed to own and manage one or more windows displayed on the surface of a display unit, where each window may be defined as a physical demarcation of space on the surface of the display unit 180. Such physical demarcation information may have been provided in the system CF 140 and read by the WG 170. The visibility of each window could be managed by the WG 170, wherein each window the appearance of widgets may be based upon both layer properties and widget parameters.

Figure 1B:
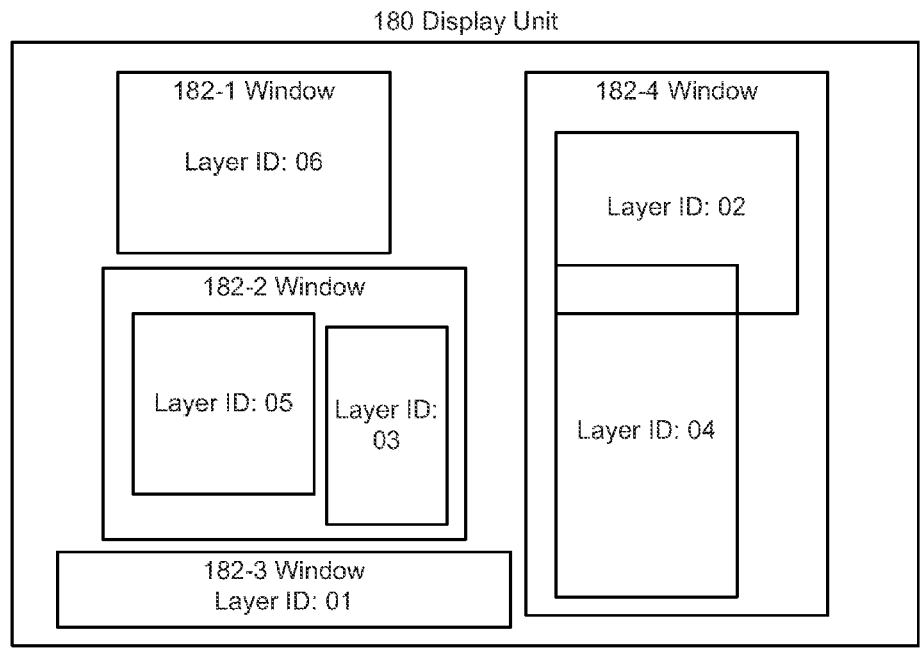
FIG. 1B depicts a plurality of layers and a plurality of windows.
Figure 1C:
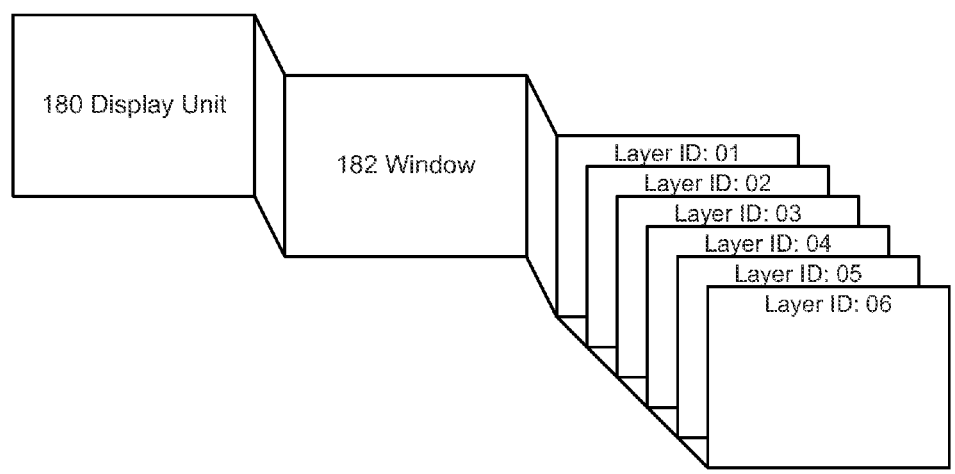
FIG. 1C depicts a plurality of overlapping layers assigned to one window.

Referring to FIGS. 1B and 1C, a plurality of windows 182 and layers are depicted for the purpose of illustration only. As shown in FIG. 1B, the WG 170 has defined a plurality of windows 182 and assigned one or more layers to areas in each window 182 based upon a display surface format. Layer 06 has been assigned an area in window 182-1, layers 03 and 05 have been assigned areas in window 182-2 and configured as non-overlapping, layer 01 has been assigned to window 182-3, and layers 02 and 04 have been assigned areas in window 182-4 and configured as overlapping.

As shown in FIG. 1C, the WG 170 has defined one window 182 and assigned a plurality of layers to overlapping the window 182 based upon a display surface format. Layers 01 through 06 have been assigned the area of window 182, where layers 02 through 06 overlap one or more of the other layers. ARINC 661 has established a map management category of widgets for presenting a plan view of a map inside of which one or more widgets defined by UAs of one or more one or more remote aircraft systems 120. While a detailed discussion of the map management category of widgets is provided in the ARINC 661 specification, a brief summary of this category is provided herein.

The map management category of widgets relates to the management of the symbology inside a map. ARINC 661 has recognized a horizontal map (e.g., a two-dimensional ND format) and a two-dimensional vertical map (e.g., a vertical situation display format). As discussed by Supplement 4 of the ARINC 661 specification, the horizontal map category is comprised of four widgets: MapHorz, MapHorz_Source, MapHorz_ItemList, and MapGrid; similarly, the vertical map category is comprised of four widgets: MapVert, MapVert_Source, MapVert_ItemList, and MapGrid. Although the following discussion will be drawn to the horizontal map category, it may be applied to the vertical map category as it has been based upon the horizontal map category which was developed prior to the vertical map category.

MapHorz consists of a rectangular region on the display containing reference information to enable the presentation of map features on the display unit(s) 180. MapHorz enables multiple sources of information with different coordinate systems to be merged into a composite map image. MapHorz provides information for resolving coordinate system disparities among the map sources, and it is considered a container widget responsible for containing multiple map sources such that the data is merged properly into a composite representation.

MapHorz_Source is defined as a container widget, where a container widget has been established to group children widgets and to provide a means for managing the visibility and the enablement of this group of children widgets. MapHorz_Source contains some MapHorz_ItemList widgets to display Items expressed in a common coordinate system. MapHorz_Source is a widget directly contained by a MapHorz or by a layer. MapHorz_Source includes a map data format parameter that defines the local coordinate system employed for a MapHorz_ItemList and enables a conversion of local coordinate system values stated in the MapHorz_ ItemList to a world coordinate system values. MapHorz_ Source can be shared between several MapHorz widgets using a connector widget. MapHorz_Source is an interactive widget, and the display area of it is the same as the display area of MapHorz.

MapHorz_ItemList represents a group of related graphics. The MapHorz_ItemList contains a list of Items to be drawn. The list has a fixed sized with a maximum number of Items. The type of each Item inside the MapHorz_ItemList can be modified at run-time, which makes the list dynamic. For the purpose of illustration and not of limitation, the MapHorz_ItemList could be used in the creation of waypoint symbol(s) or target symbol(s) comprised of visible widgets defined by a UA owned by the FMS or TCAS, respectively. Any Item in a MapHorz_ItemList has its position expressed in a local coordinate system as opposed to the display unit 180 or screen coordinate systems.

To display an Item of the MapHorz_ItemList in an image, a two-step transformation is performed to convert local coordinate system values of the Item into screen coordinate system values, where such transformation is enabled with the map data format parameter found in a MapHorz_Source widget containing such MapHorz_ItemList.

Referring to FIG. 2, a table containing a partial list of widget parameters for a MapHorz widget is shown. The PosX and PosY parameters define the X and Y positions of a widget reference point ("WRP") in the screen coordinate system. The SizeX and SizeY parameters define the area size of the MapHorz in the X and Y directions, respectively. These four parameters are set at definition time and are not modifying during run time.

The Projection Reference Point Latitude and Projection Reference Point Longitude parameters define a projection reference point ("PRP") used by the CDS 130 to know what reference should be used to run a projection algorithm. The CDS 130 converts dynamic widget coordinate data into a MapHorz coordinate system defined by a reference point and reference direction, where the reference point is a PRP with a latitude/longitude coordinate and the reference direction is True North. Common PRPs include aircraft position when ARC and ROSE modes are presented in an ND map image or waypoint position of a flight plan waypoint when an FPLN mode is presented, where these modes are known to those skilled in the art. These two parameters are not set during definition time but modifiable during run time.

The ScreenReferencePointX and Screen ReferencePointY parameters define the X and Y positions of a screen reference position ("SRP") coinciding with PRP and expressed in a MapHorz Screen Coordinate System referenced to (PosX, PosY). The Range parameter defines a geo-reference range, and the ScreenRange parameter defines a distance in screen units equivalent to the geo-referenced range, respectively. These four parameters are set during definition time and modifiable during run time.

The Orientation parameter defines an angle between True North and the up-direction of the display at the PRP, where the positive direction is counterclockwise. The AircraftOrientation parameter defines the orientation of the aircraft relative to True North, where the positive direction is clockwise. The AircraftLatitude and AircraftLongitude parameters are defined by the latitude and longitude of the aircraft. These four parameters are not set during definition time but modifiable during run time.

The advantages and benefits of the embodiments discussed herein may be illustrated by showing how ARINC 661 techniques may be exploited to define a ViewPort category of widgets to facilitate the generation of data representative of an image of a three-dimensional perspective that may be presented on the display unit 180. The ViewPort category of widgets relates to the management of the symbology presented in a three-dimensional perspective. The ViewPort category of widgets disclosed herein may be comprised of at least three widgets: ViewPort, ViewPort_Source, and ViewPort_ObjectList.

ViewPort may be comprised of a rectangular region on the display containing reference information to enable the presentation of three-dimensional perspective symbology on the display unit(s) 180. ViewPort could enable information provided by the remote aircraft system(s) 120 employing various coordinate systems to be merged into a composite three-dimensional image. ViewPort may be configured to provide information for resolving coordinate system disparities among the remote aircraft system(s) 120, and it may be considered a container widget responsible for containing data provided by the remote aircraft system(s) 120.

Referring to FIGS. 3A and 3B, a table of containing a partial list of ViewPort widget parameters and a ViewPort widget are shown, respectively. The PosX and PosY parameters could define the X and Y positions of a WRP in the screen coordinate system. The SizeX and SizeY parameters could define the area size of the ViewPort in the X and Y directions, respectively. These four parameters may be set at definition time but may not be modifiable during run time. For the purpose of illustration and not of limitation, the examples presented herein will be drawn to a WRP located at (0, 0) (the lower right-hand corner) of a widget having an area of 1400 pixels by 1050 pixels as shown in FIG. 3B (although this area could be defined in millimeters).

The ScreenReferencePointX and ScreenReferencePointY parameters may be used define the X and Y positions of an SRP coinciding with a frustum reference point ("FRP") of the near plane of a view frustum and expressed in a ViewPort Screen Coordinate System referenced to (PosX, PosY). As shown in FIG. 3B, the SRP has been configured as the approximate center of the widget (700, 525). The FOV(h) and FOV(v) parameters may be used to define the horizontal field of view spanning the X-direction and vertical FOV spanning the Y-direction, respectively. These four parameters may be set during definition time and modifiable during run time.

An exemplar of a view frustum is shown in FIG. 3C. An angle formed between the left and right sides of the view frustum is defined by a horizontal FOV (i.e., FOV(h)), and an angle formed between the top and bottom sides is defined by a vertical FOV (i.e., FOV(v)). As illustrated, a near plane 202 and a far plane 204 have cut the view frustum in two places such that the near plane 202 and the far plane 204 are perpendicular to the viewing direction. In addition, the near plane 202 has been configured with an FRP 206, where the FRP 206 coincides with the SRP. For the purpose of illustration and not of limitation, the FOV(h) and FOV(v) of the ViewPort widget will be assumed to equal 45 degrees and 33.75 degrees, respectively.

Returning to FIG. 3A, the PitchAttitude, RollAttitude, and YawAttitude parameters may be optional parameters used to define the pitch, roll, and yaw attitudes (or attitude measurements) of the aircraft, where the positive directions may be configurable by the manufacturer and/or end-user. The AircraftLatitude, AircraftLongitude, AircraftAltitude, and AircraftHeading parameters may be optional parameters used to define the latitude, longitude, altitude, and heading of the aircraft. These seven parameters may not set during definition time but may be modifiable during run time.

As embodied herein, the hierarchical structure employed by horizontal map category comprised of the MapHorz, MapHorz_Source, MapHorz_ItemList, and MapGrid widgets may be adopted by the ViewsPort, ViewPort_Source, ViewPort_ObjectList, and ViewPortGrid widgets, respectively, where the ViewPortGrid widget is discussed in detail below. Also, in addition to the parameters disclosed herein, the parameters of the MapHorz, MapHorz_Source, MapHorz_ItemList, and MapGrid widgets may be adopted by the ViewPort, ViewPort_Source, ViewPort_ObjectList, and ViewPortGrid widgets, respectively.

Figure 4A:
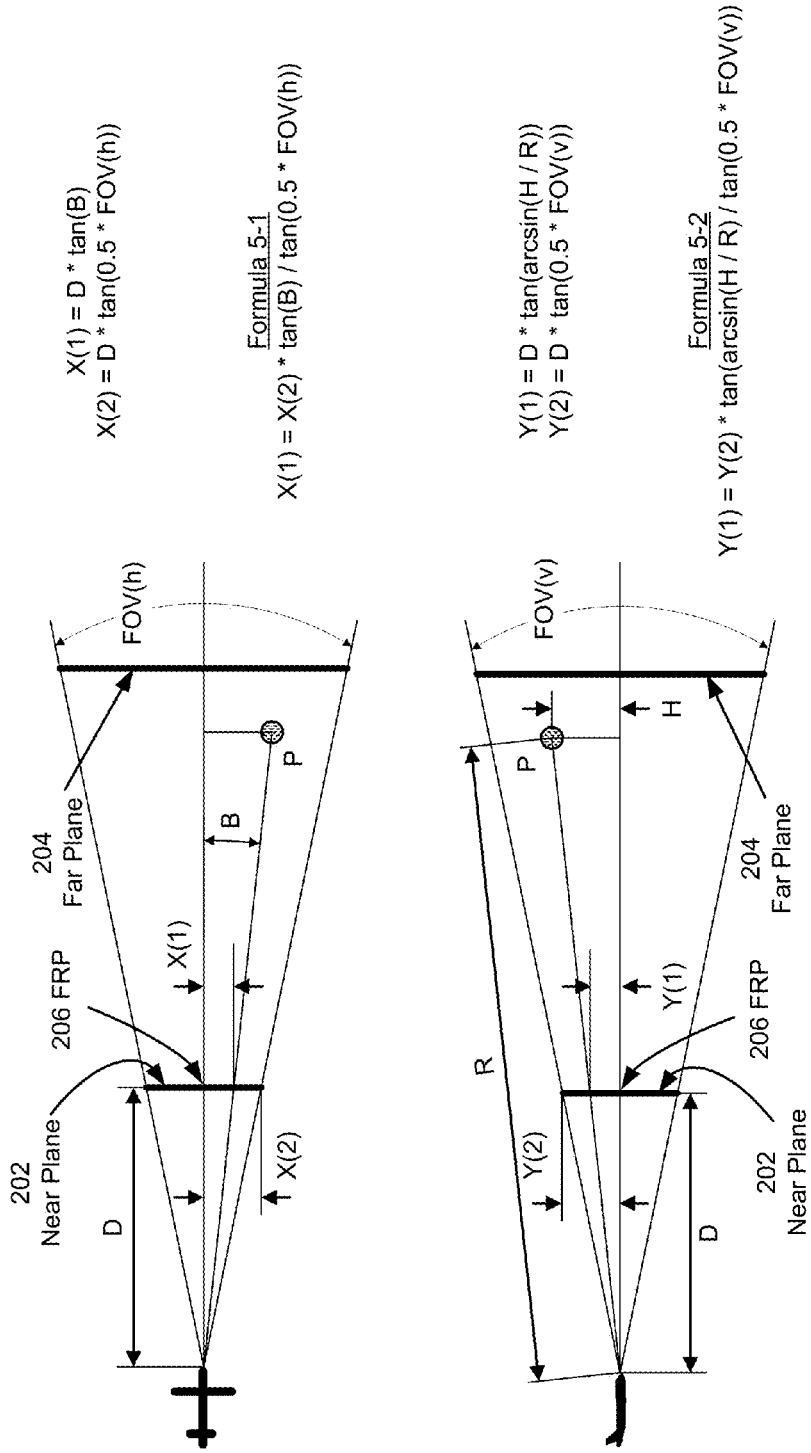
FIG. 4A depicts a projection of a point on the near plane of a view frustum.
Figure 4B:
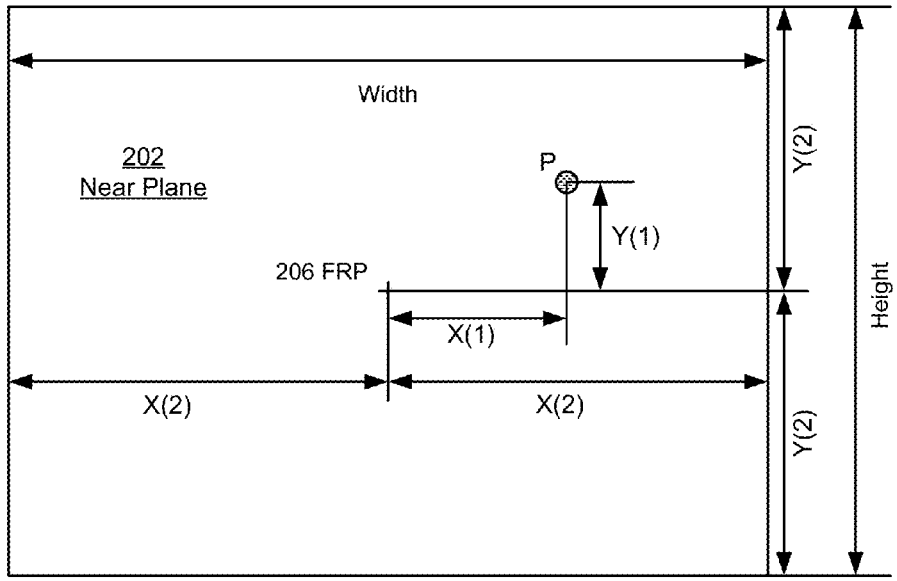
FIG. 4B depicts the near plane viewed from an aircraft.
Figure 4C:
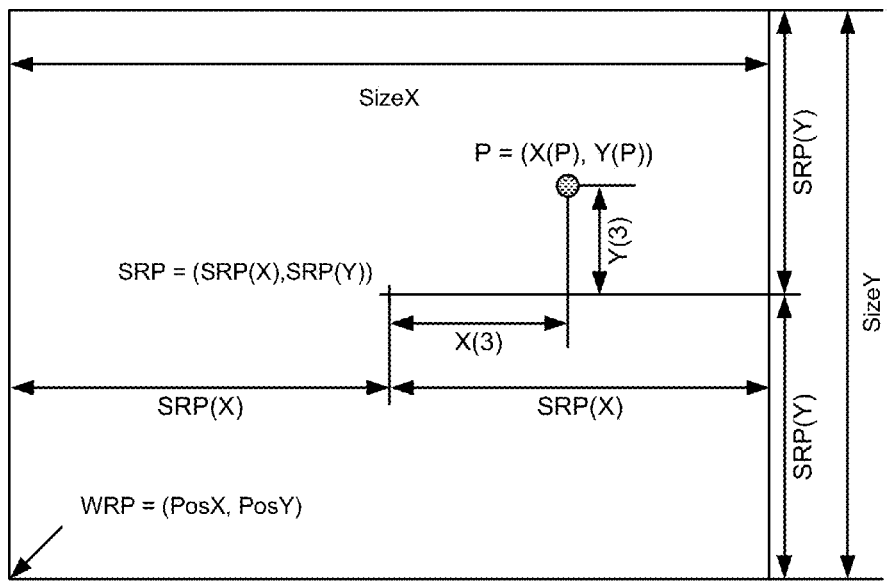
FIG. 4C depicts an image of the point presented in a three-dimensional perspective.

FIGS. 4A through 4C demonstrate how an object located at a point P within a view frustum and defined with a three-dimensional position may be projected onto both the near plane 202 and a screen of the display unit 180 as an widget corresponding to an object listed in a ViewPort_ObjectList. As embodied herein, an object may be any item on or above the surface having a defined position, where the position may be definable using a three-dimensional coordinate system. Non-exclusive examples include targets provided by a TCAS and/or ADS-B system, terrain elevation cells provided by a TAWS, and waypoints stored in an navigation system database (such as commonly employed by an FMS).

The viewing direction of the frustum originates from the position of an aircraft from which the near plane 202 is located at a distance D. For FIGS. 4A through 4C, the location of point P is defined by a range R, a bearing B, and a relative height H from the aircraft, where such information could be provided in a data block of the ViewPort_ObjectList of a remote aircraft system 130 such as the TCAS.

As illustrated in FIG. 4A, point P has been projected onto the near plane 202, where the projected horizontal and vertical locations on the near plane 202 are defined by the distances X(1) and Y(1), respectively, measured from the FRP 206. As shown by Formula 5-1, X(1) may be defined as a function of bearing B, horizontal field of view FOV(h), and X(2), where X(2) is equal to one-half the width (or horizontal dimension) of the near plane 202; likewise, as shown in Formula 5-2, Y(1) may be defined as a function of height H, range R, vertical field of view FOV(v), and Y(2), where Y(2) is equal to one-half the height (or vertical dimension) of the near plane 202.

The near plane 202 as viewed from the aircraft is illustrated in FIG. 4B. The projection of the three-dimensional point P onto the two-dimensional near plane 202 as determined by Formulas 5-1 and 5-2 is shown, where point P is located horizontally and vertically from the FRP 206 at the distances of X(1) and Y(1).

As embodied herein, the ViewPort widget may be scalable with the near plane 202. As stated above, the SRP could coincide with the FRP 206, where the aspect ratio of the area of the ViewPort widget could equal the aspect ratio of the area of the near plane 202. The permits a replacement of X(2) and Y(2) in Formulas 5-1 and 5-2 with SRP(X) and SRP(Y), respectively, as shown in Formulas 5-3 and 5-4, where SRP (X) is equal to one-half SizeY and SRP(Y) is equal to one-half the size of SizeY. As such, distance X(3) of Formula 5-3 may be defined as a function of SRP(X), bearing B, and horizontal field of view FOV(h); likewise, distance Y(3) of Formula 5-4 may be defined as a function of SRP(Y), height H, range R, and vertical field of view FOV(v).

From the discussion above, SRP(X) and SRP(Y) are defined by the ScreenReferencePointX and ScreenReferencePointY parameters, respectively, as X- and Y-distances from the WRP (PosX, PosY). Then, distance X(3) of Formula 5-3 may be defined as a function of ScreenReferencePointX, bearing B, and horizontal field of view FOV(h); likewise, distance Y(3) of Formula 5-4 may be defined as a function of ScreenReferencePointY, height H, range R, and vertical field of view FOV(v).

When referenced to the WRP, the position of the three-dimensional point P (X(P), Y(P)) may be determined using Formulas 5-5 and 5-6. Horizontal position X(P) from PosX may be defined as a function of ScreenReferencePointX, bearing B, and horizontal field of view FOV(h); likewise, vertical position Y(P) from PosY may be defined as a function of ScreenReferencePointY, height H, range R, and vertical field of view FOV(v).

It should be noted that, although the discussion of Formulas 5-1 through 5-6 has been drawn to an object defined by a range R, a bearing B, and a relative height H from the aircraft, these formulas may be employed when objects are defined with three-dimensions of another coordinate system (e.g., waypoints of a flight plan or terrain cells that are defined by latitude, longitude, and altitude/elevation). Common navigation algorithms known to those skilled in art may be employed to determine, for instance, a range R and bearing B between the aircraft and an object as a function of at least latitude, longitude, altitude, and heading of the aircraft and the latitude, longitude, and altitude/elevation of the object; also, relative height H could be based upon, in part, the difference between aircraft altitude and object altitude/elevation. As such, horizontal position X(P) and vertical position Y(P) may be further defined by the AircraftLatitude, AircraftLongitude, AircraftAltitude, and AircraftHeading parameters.

Figure 5A:
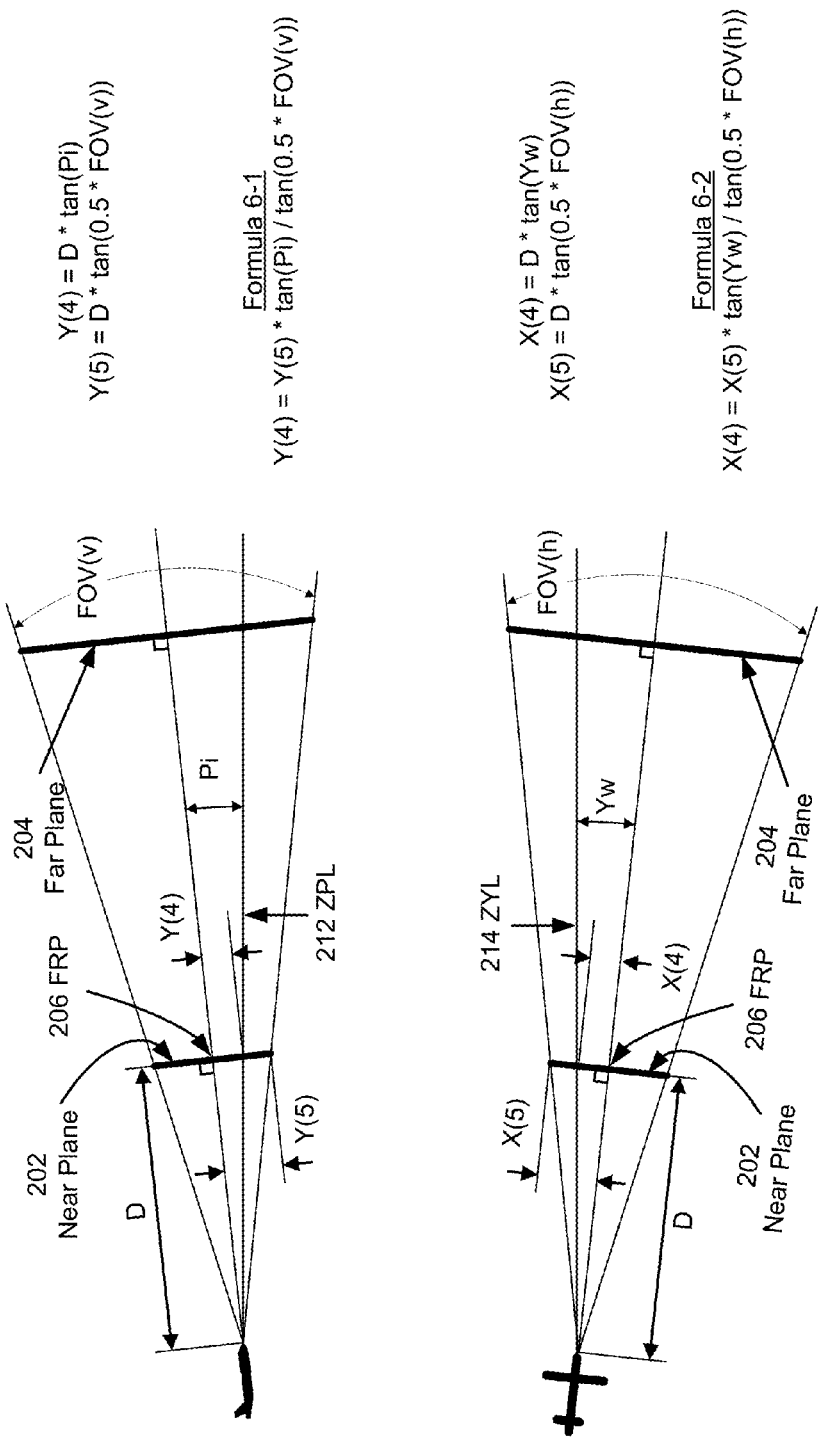
FIG. 5A depicts a projection of a point on the near plane of a view frustum as a function of pitch attitude.

In addition to the range R, bearing B, and relative height H of an object used in the determination of the object's screen position, other factors including the pitch, roll, and yaw attitudes may affect the projection of the object onto the near plane 202 and the screen position of the object. As illustrated in FIG. 5A, the aircraft has a pitch attitude Pi (which is shorthand for Pitch) other than level flight or zero degrees as measured from a zero pitch line ("ZPL") 212. As shown by Formula 6-1, Y(4) may be defined as a function of pitch Pi and FOV(v), where Y(5) is equal to one-half the width (or vertical dimension) of the near plane 202. Likewise, the aircraft has a yaw attitude Yw other than zero degrees as measured from a zero yaw line ("ZYL") 214. As shown by Formula 6-2, X(4) may be defined as a function of yaw Yw and FOV(h), where X(5) is equal to one-half the width (or horizontal dimension) of the near plane 202.

Figure 5B:
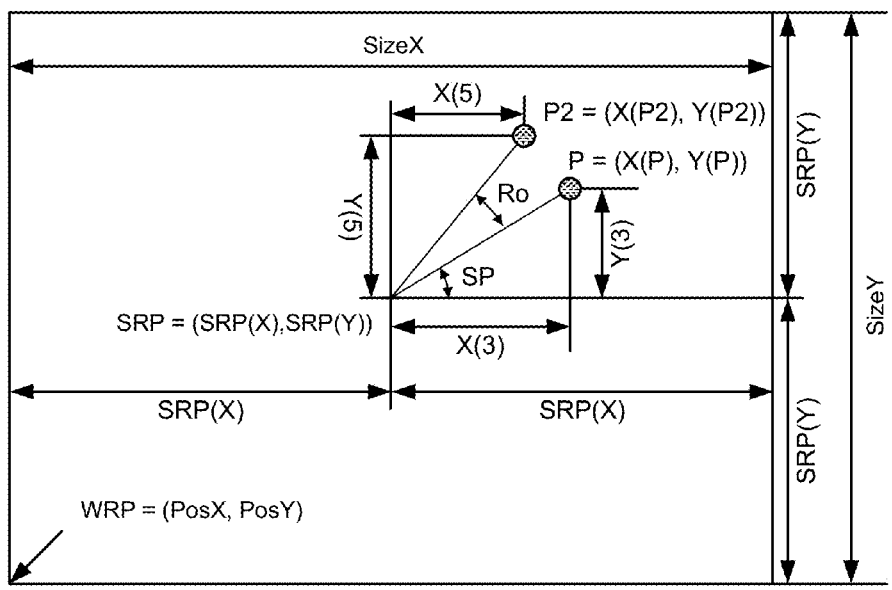
FIG. 5B depicts an image of the point presented in a three-dimensional perspective as a function of roll attitude.

As illustrated in FIG. 5B, the aircraft has a roll attitude Ro (which is shorthand for Roll) other than level flight or zero degrees as measured from a zero roll line between the SRP and P, resulting in a relative movement of point P to position P2. As shown by Formula 6-3, distance Y(5) may be defined as a function of distance X(3), distance Y(3), and roll attitude Ro, where distances X(3) and Y(3) have been defined by Formulas 5-3 and 5-4, respectively. Likewise, the position of the three-dimensional point P2 (X(P2), Y(P2)) may be determined using Formulas 6-5 and 6-6. Horizontal position X(P2) from PosX may be defined as a function of ScreenReferencePointX, roll attitude Ro, distance X(3), and distance Y(3); likewise, vertical position Y(P2) from PosY may be defined as a function of ScreenReferencePointY, attitude Ro, distance X(3), and distance Y(3).

It should be noted that the preceding discussion has been drawn towards determining the screen position of objects presented in an egocentric view; however, the embodiments herein may be applied to objects presented in an exocentric view. Exocentric projection algorithms are known to those skilled in art, where such algorithms may employ variables corresponding to rho, theta, and phi angular measurements. If so, ViewPort widget parameters such as RhoMeasurement, ThetaMeasurement, and PhiMeasurement parameters may be created and employed instead of the PitchAttitude, RollAttitude, and YawAttitude widget parameters. If the presentation of an aircraft object in the exocentric view is desirable where the object illustrates the current attitude of the aircraft, then PitchAttitude, RollAttitude, and YawAttitude widget parameters may be employed as parameters of a ViewPort_ObjectList widget, where the aircraft could be considered as another object of the exocentric view.

As mentioned above, one remote aircraft system could be comprised of a forward-looking radar system. The forward-looking radar system is well-known to those skilled in the art. A common example of a forward-looking radar system is a weather radar ("WXR") system. The forward-looking radar system may be comprised of, in part, a transceiver and antenna. A transceiver may transmit microwaves within a sweep zone into the atmosphere via an antenna which, in turn, produces a focused beam. The transceiver may control the direction of the beam by steering the antenna horizontally and vertically. When the signal strikes or reflects off an object such as meteorological conditions, part of the microwave energy is reflected back and received by the antenna. The range of the object may be determined by the transceiver by measuring the elapsed time between the transmission and reception of the signal. The azimuth of the object may be determined as the angle to which the antenna was steered in the horizontal direction relative to the longitudinal axis of the aircraft during the transmission/reception of the signal. The elevation or elevation angle of the object may be determined as the angle to which the antenna was steered in the vertical direction relative to the longitudinal axis of the aircraft during the transmission/reception of the signal. As embodied herein, a forward-looking radar system could acquire object data (which is synonymous with hazard data) including, but not limited to, range, azimuth, and elevation angle of the object, and based upon the acquired signals, could determine the location of one or more objects that comprise object data.

One example of a forward-looking radar system is the WXR-2100 MultiScan Hazard Detection Weather Radar System ("Hazard Detection System") that has been developed by Rockwell Collins. The Hazard Detection System is an example of newer technologies which have departed from the traditional or classic weather radar systems. The Hazard Detection System could employ an automatic weather sensor operative to 320 nautical miles ("NM") that displays not only classic precipitation rates but also significant weather hazards without pilot manipulation of tilt or gain settings typical of classic weather radar systems. The Hazard Detection System has many key features including, but not limited to, forward-looking windshear detection with turbulence alerts, geographic weather conditions, true zero automatic antenna misalignment compensation, overflight and predictive overflight protection, enhanced turbulence detection, flight phase hazard analysis, and storm top information. The Hazard Detection System could also include vertical display of range and height indicator, enhanced ground clutter suppression, and path attenuation compensation. As embodied herein, hazard data acquired by a forward-looking radar system could include one or more of the preceding hazards, where the inclusion of such data could be configurable to a manufacturer or end-user. This object data corresponding to hazards could be sent to the WG 170 for subsequent processing as discussed below.

As stated above, a MapGrid widget is part of both the vertical map and horizontal categories. As discussed by Supplement 4 of the ARINC 661 specification, MapGrid is used in a MapHorz_Source or MapVert_Source container widgets to provide a means for conveying arrays of data to the CDS 130 that are rendered as area fills. The intended use is for filling areas on background layers with colors and/or patterns indicative of terrain topography, precipitation intensity, or other irregular, dynamic data. The fill is defined by the number of cells in the horizontal and vertical, the size of each cell in nautical miles or equivalent, the offset of the grid's (0,0) cell from the display origin, and the Fill Style Index for each cell. Distances are described in real-world units, decoupling the UA from the specific display technology. The entire area defined by each cell boundary is to be filled with the color or pattern or other graphical attribute as selected by the Fill Style Index.

Referring to FIG. 6A, a table containing a partial list of widget parameters for a MapGird widget is shown. The CountX and CountY parameters define the number of cells along the X- and Y-axes in the array, respectively, of the screen. The OffsetX and OffsetY parameters define a horizontal and vertical offsets, respectively, between the display reference point and the grid origin. The IncrementX and IncrementY parameters define the size of each individual cell in the X- and Y-axes, respectively, in the real-world units defined by the containing Map Source. Through a BufferOfFillStyles parameter (not shown), the StartIndexX and StartIndexY parameters define indices of rows and columns, respectively, to start storing data. The NumColumns and NumRows parameters define the number of columns and rows being filled, respectively. The StepX and StepY parameters may be used to indicate whether all columns or all rows, respectively, will be included. For instance, a value of "1" for StepX indicates that every column along the X-axis will be included; a value of "2" indicates that every other column will be included; a value of "3" indicates that every third column will be included; and so on. Likewise, a value of "1" for StepY indicates that every row will be included; a value of "2" indicates that every other row will be included; a value of "3" indicates that every third row will be included; and so on. The ParameterValue defines a light of fill style index values used to select a fill style from a pre-defined table for use in filling an area.

The parameters of the MapGrid which may be adopted for the ViewPortGrid widget as shown in FIG. 6B. With respect to the IncrementX and IncrementY parameters, the sizes of each cell for the ViewPortGrid widget may be defined as angular measurements that slice the FOV(h) and FOV(v) into smaller segments, respectively. As shown in FIG. 6C, this could result in a non-uniformity of cell sizes.

Through an adoption of the MapGrid parameters, the ViewPortGrid widget may be employed in a UA of the remote aircraft system 120 such as, but not limited to, the forward-looking radar system. To illustrate how parameters of ViewPortGrid may be employed by the forward-looking radar system, assume that CountX and CountY are each set to 20, establishing a screen array of 20 columns and 20 rows as shown by columns 0 through 19 and rows 0 through 19 in FIG. 6C.

Assuming the FOV(h) and FOV(v) are 40 and 30 degrees, respectively, IncrementX and IncrementY may be set to 2 and 1.5, where each column is 2 degrees wide and each row is 1.5 degrees tall (measured from the same reference as FIV(h) and FOV(v)). If the azimuth of the forward-looking radar system is assumed to be 30 degrees wide (from −15 to +15 degrees) and further assumed that hazard data will be collected 16 times per row from left to right at intervals of two degrees between −15 and +15 degrees azimuth, inclusive, then NumColumns may be set to 16 with a StartIndexX set to 2, resulting in a collection of data in between columns 2 and 17, inclusive, as shown by the filled cells in FIG. 6B. If the elevation of the forward-looking radar system is assumed to be 18 degrees high (from +6 to −12 degrees) and further assumed that hazard data will be collected 12 times from the top to the bottom between +5.25 and −11.25 degrees elevation, inclusive, then NumRows may be set to 20 with a StartIndexY set to 6, resulting in a collection of data in between rows 6 and 17, inclusive as shown by the filled cells in FIG. 6B.

The ViewPortGrid widget could include a StartIndexZ parameter defining an index of cell layers to start storing data. A NumCellLayers parameter defines the number of cell layers being filled. The StepZ parameter may be used to indicate whether all cell layers will be included. For instance, a value of "1" for StepZ indicates that every cell layer along the Z-axis will be included; a value of "2" indicates that every other cell layer will be included; a value of "3" indicates that every third cell layer will be included; and so on. The ParameterValue defines a light of fill style index values used to select a fill style from a pre-defined table for use in filling an area. If the range of the forward-looking radar system is assumed to be 50 NM (from 0 to 50 NM) and further assumed that hazard data will be collected 50 times between 0.5 and 49.5 NM range, inclusive, then NumCellLayers may be set to 50 with a StartIndexZ set to 0, resulting in a collection of data between cell layers 0 and 49, inclusive.

In one configuration, the forward-looking radar system could be configured to acquire hazard data by performing an equivalent of three loops, where a range-loop is nested by an azimuth-loop which, in turn, is nested by an elevation-loop. Using the assumed values stated above, the acquisition of hazard data could begin with the range-loop at the [azimuth, elevation, range] of [−15, +5.25, 0.5] and continue to acquire hazard data every 1 NM until the 49.5 NM has been reached. Upon the completion of each range-loop, the azimuth-loop could be stepped up 2 degrees until +15 degrees has been reached. Upon the completion of each azimuth-loop, the elevation-loop could be stepped down by 0.75 degrees until −11.25 degrees has been reached until each of the cells is filled.

With the given forward-looking radar system configuration, the ViewPortGrid widget could be configured to store fill style index values in each of the cells by performing three loops, where the Z-loop is nested by the X-loop which, in turn, is nested by the Y-loop. The Z-loop could begin to store index values at the cell indexed by [StartIndexX, StartIndexY, StartIndexZ] and continue to store index values as specified by the StepZ parameter until the specified NumCellLayers have been filled. Upon the completion of each Z-loop, the X-loop could be stepped up by StepX until the specified NumColumns has been reached. Upon the completion of each X-loop, the Y-loop could be stepped up by StepY until the specified NumRows has been reached, whereupon the completion a fill style index value is stored in each of the cells.

Figure 7:
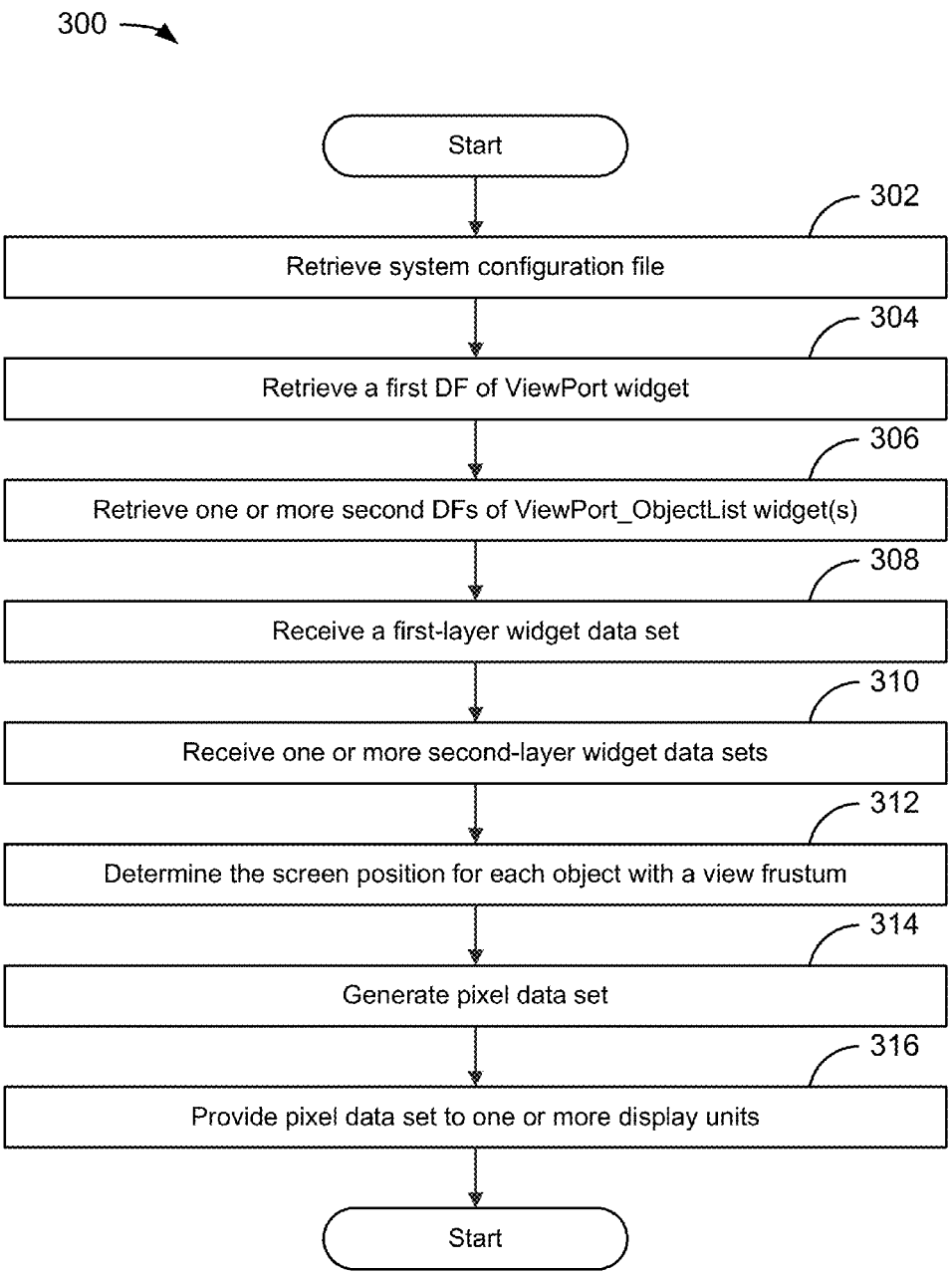
FIG. 7 depicts a first flowchart of a method for generating object symbology for on aircraft display unit.
Figure 8:
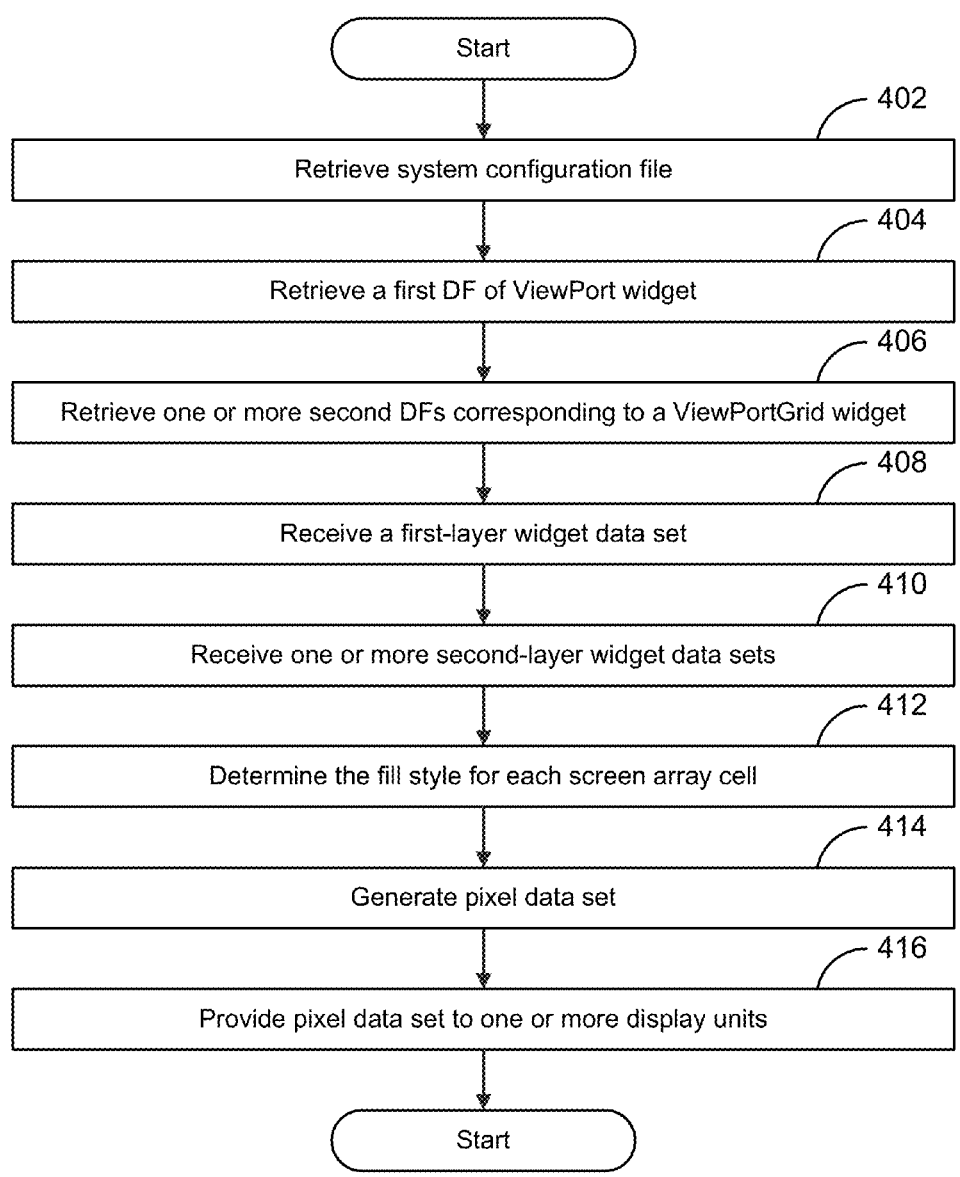
FIG. 8 depicts a second flowchart of a method for generating object symbology for on aircraft display unit.

FIGS. 7 and 8 depict flowcharts 300 and 400 disclosing examples of methods for generating object and fill symbologies, respectively, on an aircraft display unit, where the WG 170 may be programmed or configured with instructions corresponding to the following modules embodied in the flowchart. Also, the WG 170 may be a processor of a physical or tangible module such as, but not limited to, a printed circuit board having one or more input interfaces to facilitate the two-way data communications of the WG 170, i.e., to facilitate the receiving and providing of data. As necessary for the accomplishment of the following modules embodied in the flowchart, the receiving of data is synonymous and/or interchangeable with the retrieving of data, and the providing of data is synonymous and/or interchangeable with the making available or supplying of data.

Flowchart 300 begins with module 302 with the retrieving of a system CF 140 by the WG 170. The CF 140 could include the identification of one or more layers. The CF 140 could also include the display configuration format which configures the display surface of the display unit 180 with one or more windows. The layers may be assigned to the same area of one window. In addition, the system CF 140 could include some of the parameters of the ViewPort widget which a manufacturer and/or end-user may choose to make fixed values and/or remove as ViewPort widget parameters, where such parameters could include one or more of the following: PosX, PosY, SizeX, and SizeY.

The flowchart continues with module 304 with the retrieving of one definition file comprised of a first layer which, in turn, may be comprised of one or more first-layer widgets defined by sets of widget parameters. As embodied herein, one first-layer widget could be the ViewPort widget (or equivalent functioning widget) which could facilitate the projection on a two-dimensional screen of objects identified in children widgets. In one embodiment, the first-layer widget parameters could include parameters corresponding to a first angular measurement, a second angular measurement, a third angular measurement, ScreenReferencePointX, ScreenReferencePointY, FOV(h), and FOV(v). In another embodiment, the first-layer widget parameters could include the PosX, PosY, SizeX, and/or SizeY parameters if not provided elsewhere.

In an embodiment in which objects may be presented against the background of an egocentric view, the first, second, and third angular measurements could be comprised of pitch, roll, and yaw attitudes. In an embodiment in which objects may be presented against the background of an exocentric view, the first, second, and third angular measurements could be comprised of rho, theta, and phi measurements employed by an exocentric view system, where the employment of such measurements and the generation of an exocentric view are known to those skilled in the art. In an additional embodiment, one or more first-layer widgets could be comprised of connector widgets, where each connector widget is connected to a second layer.

The flowchart continues with module 306 with the retrieving of one or more definition files comprised of one or more second layers. Each second layer may be defined with one or more second-layer widgets, and each second-layer widget may be comprised of one or more second-layer widgets defined by sets of widget parameters. One or more second-layer widgets could be comprised of the ViewPort_ObjectList widget (or an equivalent functioning widget) which may be defined with a set of second-layer widget parameters corresponding to a number of objects, a three-dimensional location of each object, and a type of symbol for each object, where these parameters are the same or similar to parameters employed by MapHorz_ItemtList or MapVert_ItemtList widgets.

One or more second-layer widgets could be comprised of the ViewPort_Source widget (or an equivalent functioning widget) which may be defined with a set of second-layer widget parameters comprised of a type of coordinate system identifier, where this parameter is similar to a parameter corresponding to the format of the data employed by MapHorz_Source or MapVert_Source widgets. As embodied herein, the first-layer widget may employ a default coordinate system from which object screen position may be determined; for example, the default coordinate system could be a relative coordinate system such as a range/bearing/relative height coordinate system. A second-layer widget (e.g., ViewPort_ObjectList widget) sending three-dimensional location referenced to the default coordinate system may not need another second-layer widget (e.g., ViewPort_Source widget) identifying the type of coordinate system when it is sent to the first-layer widget; the use could be optional. Where the three-dimensional object location does not conform, an additional second-layer widget identifying the type of coordinate system need to be sent. For example, if the default coordinate system is a relative coordinate system and the three-dimensional object location is referenced to an absolute coordinate system (e.g., latitude/longitude/altitude or elevation coordinate system) or other coordinate system, the parameters of a ViewPort_Source widget may be sent with the parameters of the ViewPort_ObjectList widget.

If the three-dimensional object location is not referenced to the default coordinate system, the first-layer widget parameters could be further comprised of parameters required for a conversion to the default coordinate system. For example, if the default coordinate system is comprised of a range/bearing/relative height coordinate system and the three-dimensional object location is referenced to a latitude/longitude/altitude coordinate system, additional first-layer widget parameters corresponding to the latitude, longitude, altitude, and heading of the aircraft could be included, where such data representative of these parameters could be provided by the aircraft navigation system.

One or more second-layer widgets could be comprised of the ViewPortGrid widget (or an equivalent functioning widget) which may be defined with a set of second-layer widget parameters that could include the Num Rows parameter, the NumColumns parameter, and ParameterValue parameter, where the ParameterValue parameter corresponds to a fill style index value of an object (e.g., hazard) along the Z-axis. As embodied herein, the object could be comprised of an atmospheric hazard and/or terrain acquired by the forward-looking radar system.

One or more second-layer widgets could be comprised of the ViewPort_Source widget (or an equivalent functioning widget) which may be defined with a set of second-layer widget parameters comprised of a type of coordinate system identifier, where this parameter is similar to a parameter corresponding to the format of the data employed by MapHorz_Source or MapVert_Source widgets. As embodied herein, the first-layer widget may employ a default coordinate system from which object screen position may be determined; for example, the default coordinate system could be a relative coordinate system such as an azimuth/elevation/range coordinate system. A second-layer widget (e.g., ViewPortGrid widget) sending three-dimensional location referenced to the default coordinate system may not need another second-layer widget (e.g., ViewPort_Source widget) identifying the type of coordinate system when it is sent to the first-layer widget; the use could be optional. Where the three-dimensional object location does not conform, an additional second-layer widget identifying the type of coordinate system may be needed to be sent.

Modules 302 through 306, inclusive, may be considered as being performed in a first phase prior to exchanges of data between one or more remote aircraft systems 120 and the CDS 130. This phase may be comparable with the initialization phase as discussed in ARINC 661. Modules 308 through 316, inclusive, may be considered to be performed in a second phase in which there are exchanges of data between the remote aircraft systems 120 and the CDS 130. This phase may be comparable with the run-time phase as discussed in ARINC 661.

The flowchart continues with module 308 with the receiving of a first-layer widget data set sent from a first UA, where such data set may be representative of the set of first-layer widget parameters. As embodied herein, the owner of the first UA could be the aircraft navigation system. In an embodiment in which the WMUA 160 is employed, the first UA could be comprised of the WMUA 160; if so, the WMUA 160 could be configured to receive data provided by the aircraft navigation system.

The flowchart continues with module 310 with the receiving of one or more second-layer widget data sets sent from one or more second UAs, where each data set may be representative of a set of second-layer widget parameters. As embodied herein, the owner of the first UA and the owner of one or more second UAs could be the same owner. For example, the aircraft navigation system could provide first-layer widget parameters comprised of pitch, roll, and yaw attitudes along with three-dimensional object locations of flight plan waypoints.

The flowchart continues with modules 312 with the determining of the screen position of each object located within a view frustum as a function of the first-layer widget data set and the three-dimensional object location of each object represented in a set of second-layer widget parameters. Such determination may be made as shown in the examples discussed in detail above.

The flowchart continues with module 314 with the generating of a pixel data set in response to the determination of module 312. The pixel data set may be representative of one or more symbols. Each symbol could correspond to the type of symbol for each object located within the view frustum, where the type of symbol may be specified in the second-layer widget parameter.

The flowchart continues with module 316 with the providing of the pixel data set to one or more display units 180. Each object located within the view frustum may be presented at its screen position determined in module 312. In one embodiment, the presentation of each object may be made against a three-dimensional egocentric perspective of a scene. In another embodiment, the presentation of each object may be made against a three-dimensional exocentric perspective of a scene. Then, the flowchart proceeds to the end.

Flowchart 400 begins with module 402 with the retrieving of a system CF 140 by the WG 170. The CF 140 could include the identification of one or more layers. The CF 140 could also include the display configuration format which configures the display surface of the display unit 180 with one or more windows. The layers may be assigned to the same area of one window. In addition, the system CF 140 could include some of the parameters of the ViewPort widget which a manufacturer and/or end-user may choose to make fixed values and/or remove as ViewPort widget parameters, where such parameters could include one or more of the following: PosX, PosY, SizeX, and SizeY.

The flowchart continues with module 404 with the retrieving of one definition file comprised of a first layer which, in turn, may be comprised of one or more first-layer widgets defined by sets of widget parameters. As embodied herein, one first-layer widget could be the ViewPort widget (or equivalent functioning widget) which could facilitate the projection on a two-dimensional screen of fill styles identified in children widgets. In one embodiment, the first-layer widget parameters could include the CountX parameter, the CountY parameter, the IncrementX parameter corresponding to an angular measurement of size of each cell along the X-axis of the screen array, and IncrementY parameter corresponding to an angular measurement of size of each cell along the Y-axis of the screen array. In an additional embodiment, one or more first-layer widgets could be comprised of connector widgets, where each connector widget is connected to a second layer.

The flowchart continues with module 406 with the retrieving of one or more definition files, each being comprised of one or more second layers. Each second layer may be defined with one or more second-layer widgets, and each second-layer widget may be comprised of one or more second-layer widgets defined by sets of widget parameters. One or more second-layer widgets could be comprised of the ViewPort-Grid widget (or an equivalent functioning widget) which may be defined with a set of second-layer widget parameters that could include the Num Rows parameter, the NumColumns parameter, and ParameterValue parameter, where the ParameterValue parameter corresponds to a fill style index value of an object (e.g., hazard) along the Z-axis. As embodied herein, the object could be comprised of an atmospheric hazard and/or terrain acquired by the forward-looking radar system.

One or more second-layer widgets could be comprised of the ViewPort_Source widget (or an equivalent functioning widget) which may be defined with a set of second-layer widget parameters comprised of a type of coordinate system identifier, where this parameter is similar to a parameter corresponding to the format of the data employed by MapHorz_Source or MapVert_Source widgets. As embodied herein, the first-layer widget may employ a default coordinate system from which object screen position may be determined; for example, the default coordinate system could be a relative coordinate system such as an azimuth/elevation/range coordinate system. A second-layer widget (e.g., ViewPortGrid widget) sending three-dimensional location referenced to the default coordinate system may not need another second-layer widget (e.g., ViewPort_Source widget) identifying the type of coordinate system when it is sent to the first-layer widget; the use could be optional. Where the three-dimensional object location does not conform, an additional second-layer widget identifying the type of coordinate system may be needed to be sent.

Modules 402 through 406, inclusive, may be considered as being performed in a first phase prior to exchanges of data between one or more remote aircraft systems 120 and the CDS 130. This phase may be comparable with the initialization phase as discussed in ARINC 661. Modules 408 through 416, inclusive, may be considered as being performed in a second phase in which there are exchanges of data between the remote aircraft systems 120 and the CDS 130. This phase may be comparable with the run-time phase as discussed in ARINC 661.

The flowchart continues with module 408 with the receiving of a first-layer widget data set sent from a first UA, where such data set may be representative of the set of first-layer widget parameters. As embodied herein, the owner of the first UA could be the forward-looking radar system. In an embodiment in which the WMUA 160 is employed, the first UA could be comprised of the WMUA 160; if so, the WMUA 160 could be configured to receive data provided by the aircraft navigation system and/or the forward-looking radar system. In another embodiment, the owner of the first UA could be the aircraft navigation system and/or the owner of the second UA could be the forward-looking radar system.

The flowchart continues with module 410 with the receiving of one or more second-layer widget data sets sent from one or more second UAs, where each data set may be representative of a set of second-layer widget parameters. As embodied herein, the owner of the first UA and the owner of one or more second UAs could be the same owner.

The flowchart continues with modules 412 with the determining of the fill style of each screen array cell as a function of the first-layer widget data set and the second-layer widget data set. The flowchart continues with module 414 with the generating of a pixel data set in response to the determination of module 412. The pixel data set may be representative of one or more fill styles, where symbology of each fill style is formatted for presentment in a three-dimensional perspective on one or more display units 180.

The flowchart continues with module 416 with the providing of the pixel data set to one or more display units 180. Symbology of each fill style may be presented in its cell of the screen array. In one embodiment, the presentation of each object may be made against a three-dimensional egocentric perspective of a scene. In another embodiment, the presentation of each object may be made against a three-dimensional perspective of a scene. Then, the flowchart proceeds to the end.

It should be noted that the method steps described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for generating object symbology presentable on an aircraft display unit, such system comprising:
    at least one aircraft system, where
        each aircraft system is an owner of at least one user application; and
    a cockpit display system comprised of
        a system configuration file,
        a plurality of definition files, and
        a windows generator configured to
            perform a first operation, where such first operation is configured to retrieve the system configuration file,
                retrieve one first definition file comprised of a first layer, where
                    the first layer is comprised of a plurality of first-layer widgets, where
                    each first-layer widget is defined by a set of widget parameters, and
                    one first-layer widget is defined with a set of first-layer widget parameters comprised of
                        a number of cells along a first axis of a screen array parameter,
                        a number of cells along a second axis of the screen array parameter,
                        an angular measurement of size of each cell along the first axis of the screen array parameter, and
                        an angular measurement of size of each cell along the second axis of the screen array parameter, and
                retrieve at least one second definition file, wherein
                    each second definition file is comprised of at least one second layer, where
                    each second layer is comprised of at least one second-layer widget, where
                    at least one second-layer widget is defined with a set of second-layer widget parameters comprised of
                        a number of rows parameter,
                        a number of columns parameter, and
                        a fill style parameter, where
                            the fill style parameter is indicative of an object located along a third axis, and
            perform a second operation, where such second operation is configured to receive a first-layer widget data set, wherein
                the first-layer widget data set is representative of the set of first-layer widget parameters,
                receive at least one second-layer widget data set, wherein
                    each second-layer widget data set is representative of one set of second-layer widget parameters, where
                    the first-layer widget data set and each second-layer widget data set have been sent under one uniform communication interface protocol,
                determine the fill style of each screen array cell as a function of at least
                    the first-layer widget data set, and
                    each second-layer widget data set, and
                generate a pixel data set responsive to the determination and representative of at least one fill style, such that
                    symbology of each fill style is presentable for a three-dimensional perspective.

2. The system of claim 1, wherein
the set of first-layer widget parameters is further comprised of
    a plurality of screen reference position parameters, and
    a plurality of field of view parameters.

3. The system of claim 1, wherein
the set of second-layer widget parameters is further comprised of
    a number of cell layers parameter along the third axis.

4. The system of claim 1, wherein the first-layer widget data set is received from a first user application owned by an aircraft navigation system, at least one second-layer widget data is received from a second user application owned by a forward-looking radar system, or both.

5. The system of claim 4, wherein the object is comprised of an atmospheric hazard.

6. The system of claim 4, wherein the object is comprised of terrain.

7. The system of claim 1, wherein the cockpit display system is further comprised of at least one display unit configured to receive the pixel data set provided by the windows generator, and present the symbology of each fill style represented in the pixel data set on the screen of each display unit.

8. A device for generating object symbology presentable on an aircraft display unit, such device comprising:

a windows generator configured to perform a first operation, where such first operation is configured to retrieve a system configuration file;

retrieve one first definition file comprised of a first layer, where the first layer is comprised of a plurality of first-layer widgets, where each first-layer widget is defined by a set of widget parameters, and one first-layer widget is defined with a set of first-layer widget parameters comprised of a number of cells along a first axis of a screen array parameter, a number of cells along a second axis of the screen array parameter, an angular measurement of size of each cell along the first axis of the screen array parameter, and an angular measurement of size of each cell along the second axis of the screen array parameter; and retrieve at least one second definition file, wherein each second definition file is comprised of at least one second layer, where each second layer is comprised of at least one second-layer widget, where at least one second-layer widget is defined with a set of second-layer widget parameters comprised of a number of rows parameter, a number of columns parameter, and a fill style parameter, where the fill style parameter is indicative of an object located along a third axis; and perform a second operation, where such second operation is configured to receive a first-layer widget data set, wherein the first-layer widget data set is representative of the set of first-layer widget parameters;

receive at least one second-layer widget data set, wherein each second-layer widget data set is representative of one set of second-layer widget parameters, where the first-layer widget data set and each second-layer widget data set have been sent under one uniform communication interface protocol;

determine the screen array cell of each fill style as a function of at least the first-layer widget data set, and each second-layer widget data set; and generate a pixel data set responsive to the determination and representative of at least one fill style, such that symbology of each fill style is presentable for a three-dimensional perspective.

9. The device of claim 8, wherein the set of first-layer widget parameters is further comprised of a plurality of screen reference position parameters, and a plurality of field of view parameters.

10. The device of claim 8, wherein the set of second-layer widget parameters is further comprised of a number of cell layers parameter along the third axis.

11. The device of claim 8, wherein the first-layer widget data set is received from a first user application owned by an aircraft navigation system, at least one second-layer widget data is received from a second user application owned by a forward-looking radar system, or both.

12. The device of claim 11, wherein the object is comprised of an atmospheric hazard.

13. The device of claim 11, wherein the object is comprised of terrain.

14. The device of claim 8, wherein the windows generator is further configured to provide the pixel data set to at least one display unit, whereby the symbology of each fill style represented in the pixel data set is presented on the screen of each display unit.

15. A method for generating object symbology presentable on an aircraft display unit, such method comprising:

performing a first operation, where such first operation is configured to retrieving a system configuration file;

retrieving one first definition file comprised of a first layer, where the first layer is comprised of a plurality of first-layer widgets, where each first-layer widget is defined by a set of widget parameters, and one first-layer widget is defined with a set of first-layer widget parameters comprised of a number of cells along a first axis of a screen array parameter, a number of cells along a second axis of the screen array parameter, an angular measurement of size of each cell along the first axis of the screen array parameter, and an angular measurement of size of each cell along the second axis of the screen array parameter; and retrieving at least one second definition file, wherein each second definition file is comprised of at least one second layer, where each second layer is comprised of at least one second-layer widget, where at least one second-layer widget is defined with a set of second-layer widget parameters comprised of a number of rows parameter,
a number of columns parameter, and
a fill style parameter, where
the fill style parameter is indicative of an object located along third axis; and
performing a second operation, where such second operation is configured to
receiving a first-layer widget data set, wherein
the first-layer widget data set is representative of the set of first-layer widget parameters;
receiving at least one second-layer widget data set, wherein
each second-layer widget data set is representative of one set of second-layer widget parameters, where
the first-layer widget data set and each second-layer widget data set have been sent under one uniform communication interface protocol;
determining the screen array cell of each fill style as a function of at least
the first-layer widget data set, and
each second-layer widget data set; and
generating a pixel data set responsive to the determination and representative of at least one fill style, such that
symbology of each fill style is presentable for a three-dimensional perspective.

16. The method of claim 15, wherein
the set of first-layer widget parameters is further comprised of
a plurality of screen reference position parameters, and
a plurality of field of view parameters.
17. The method of claim 15, wherein
the set of second-layer widget parameters is further comprised of
a number of cell layers parameter along the third axis.
18. The method of claim 15, wherein
the first-layer widget data set is received from a first user application owned by an aircraft navigation system,
at least one second-layer widget data is received from a second user application owned by a forward-looking radar system, or
both.
19. The method of claim 18, wherein the object is comprised of an atmospheric hazard.
20. The method of claim 18, wherein the object is comprised of terrain.
21. The method of claim 15, further comprising:
providing the pixel data set to at least one display unit, whereby
the symbology of each fill style represented in the pixel data set is presented on the screen of each display unit.

\* \* \* \* \*